(No Model.)

W. H. PUTNAM.
CHICKEN HOUSE.

No. 508,529. Patented Nov. 14, 1893.

Witnesses:
M. S. Logan
J. K. Bailey

Inventor:
Wm H Putnam,
By James H Bailey attorney

UNITED STATES PATENT OFFICE.

WILLIAM H. PUTNAM, OF SMITHTON, MISSOURI.

CHICKEN-HOUSE.

SPECIFICATION forming part of Letters Patent No. 508,529, dated November 14, 1893.

Application filed February 16, 1893. Serial No. 462,652. (No model.)

*To all whom it may concern:*

Be it known that I, WILLIAM H. PUTNAM, a citizen of Morgan county, residing near Smithton, State of Missouri, have invented certain new and useful Improvements in House and Feed-Coop Combined for Raising Domestic Fowls; and I do hereby declare the following to be a full, clear, and exact description of my invention, such as will enable others skilled in the art to which it appertains to make and use the same.

This invention relates to a safety house and feed coop combined, for the purpose of propagating domestic fowls, and is specially arranged and adapted so as to furnish secure protection for the young brood from depredations of rats, skunks, and other carnivorous animals during the night, while the slatted feed coop attached to the house furnish secure protection to the young fowls while eating, and from being trampled upon by the large or grown fowls, during the day time, all the advantages of which I attain by the mechanical construction, combination and arrangement of parts herein described and illustrated in the accompanying drawings forming part of this specification and to the letters of reference marked thereon, as hereinafter more fully described and pointed out in the claims.

Figure 1:
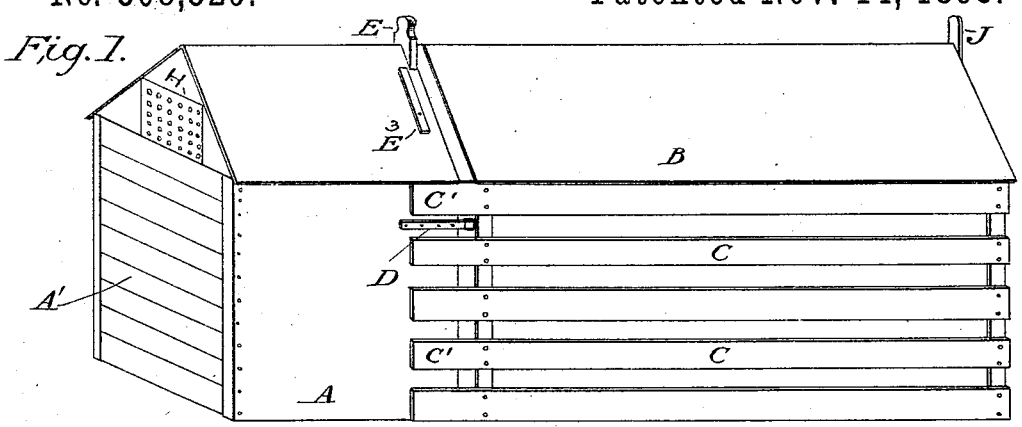
Figure 2:
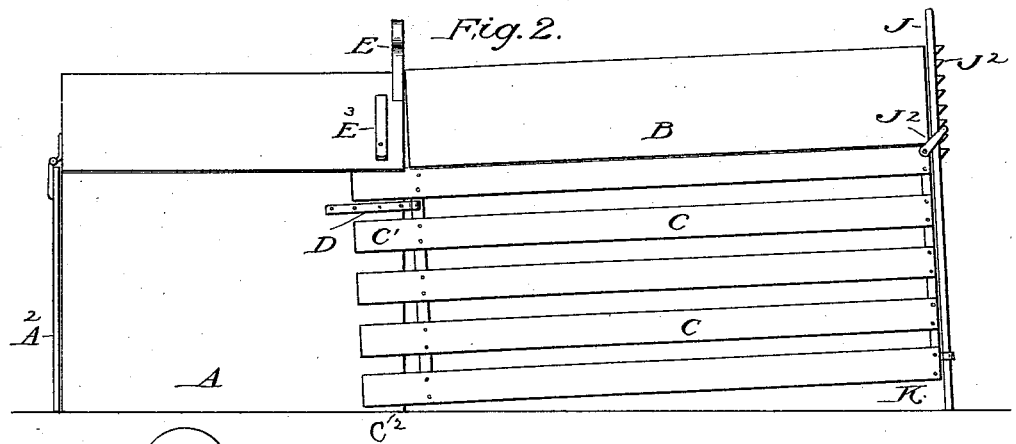
Figure 3:
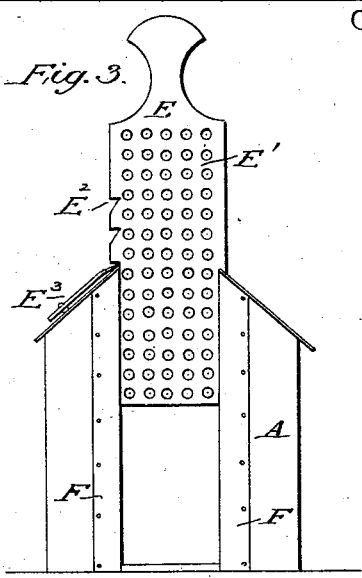
Figure 4:
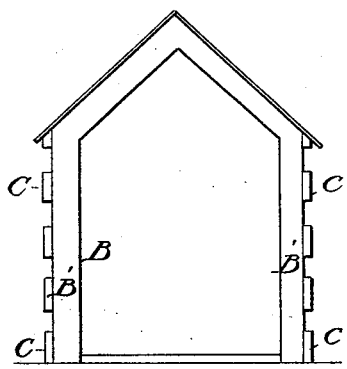
Figure 5:
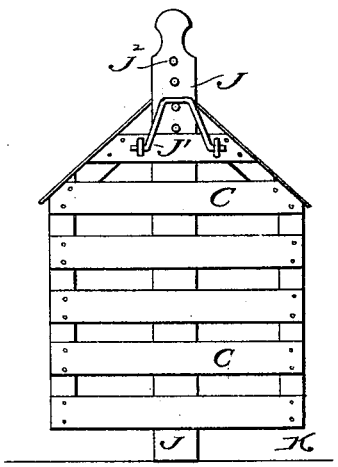

Referring to the drawings Figure 1. is a perspective view of my improved safety house and feed coop combined. Fig. 2. is a view of same in side elevation. Fig. 3. is an end view of the inner end portion of the house, to which the coop is attached. Fig. 4 is an end view of the inner part of the feed coop, and Fig. 5. is an outer, end view of same.

In the drawings A. represents the safety house, in which the young fowls are inclosed during night or stormy days.

B. represents the house shaped feed coop consisting of a suitable frame B'. to which the roof, and slats C are secured, having suitable spaces between the slats. Slats C are to keep out the large or grown fowls while the young brood is eating within the coop.

The inner end of the coop B is joined to the house A by suitable loose jointed hinges D. which hold it in position, and is also provided with additional lateral support for said coop, by means of the projecting ends C' of the side slats C. which are made longer than the roof portion projecting over or beyond the end $C^2$. of the house engaging with the sides thereof, as shown.

The inner end of the house A. is provided with a vertically adjustable door E which slides in suitable grooves formed on the inner sides or edges of the two bars or battens F. and is raised to a suitable height to permit the fowls passing out into the feed coop during day time and is again closed down at night to protect them against depredations of destructive animals. The door E is provided with a series of perforations E'. which furnish ventilation; and in order to secure a free circulation through the house during hot weather, I provide a perforated gable end door H shown at drawing Fig. 1.

The outer end of the house A. is provided with a slatted door A'. for day use, and is also provided with a solid door $A^2$. which shuts over the slatted door closing the end of the house securely during night or stormy days, shown at drawings Figs. 1. and 2.

J. is a piece of timber made vertically adjustable passing through suitable guides, either on the inner or outer side of the end slats C of the coop, and is provided with a suitable latch or crank shaped double ended bail J'. catching over suitable notches or pins $J^2$. of the upright J. and is used for the purpose of holding the end of the coop at any desired height above the ground K to permit the young fowls passing out and in during the day time.

Referring again to the door E. which is provided with suitable notches $E^2$. and latch $E^3$. attached to the house or roof thereof, by which means the door, when raised to a suitable height above the floor is held in that position.

The usual size of constructing the house is about three feet wide by about four feet long, while the feed coop is made from four to eight feet long as may be preferred.

When moving the house and coop from place to place on the yard, the coop is lifted off of its hinges D, and moved separately and again hinged in position.

Having thus fully described my invention, what I claim as new and useful, and desire to secure by Letters Patent, is—

1. The within described house and feed coop for propagating domestic fowls, the same comprising the combination of the house A. having the coop B hinged thereto, the slats C having the projecting ends C' which engage the sides of the house, the vertically adjustable ventilating door E and window H. all arranged substantially as specified.

2. The within described house and feed coop for propagating domestic fowls, the same comprising, the combination of the house A. having the coop B. loosely hinged thereto, the slats C having the projecting ends C' which engage the sides of the house, and the adjusting upright J. for elevating the outer end of said coop, substantially as and for the purpose specified.

3. The within described house and feed coop combined for propagating domestic fowls the same comprising the house A having the feed coop B. hinged thereto, the slats C having the projecting ends C' which engage the sides of the house, the adjusting upright J for elevating the outer end of the coop, the inner vertically adjustable ventilating door E of the house, the slatted, end door A' and the outer shutter A². thereof, all in combination substantially as specified.

4. The within described chicken house and feed coop combined, comprising the house A. provided with a ventilating door E. having the slatted feed coop B detachably connected to said house, and means of adjusting the outer end of said coop to a suitable height above the ground, substantially as and for the purpose specified.

In testimony whereof I affix my signature in presence of two witnesses.

WM. H. PUTNAM.

Witnesses:
JOHN R. CLOPTON,
J. M. LOGAN.